UNITED STATES PATENT OFFICE.

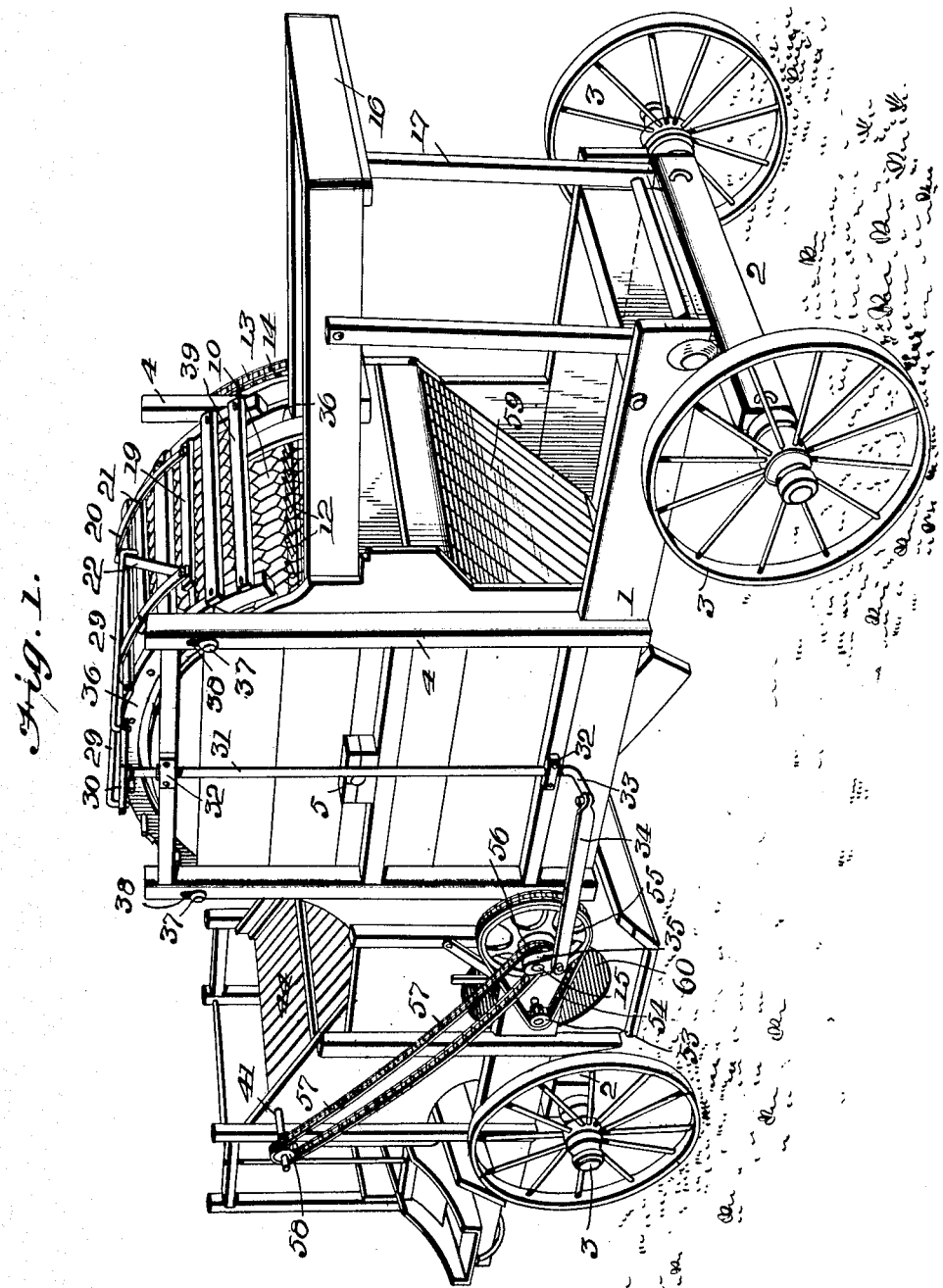

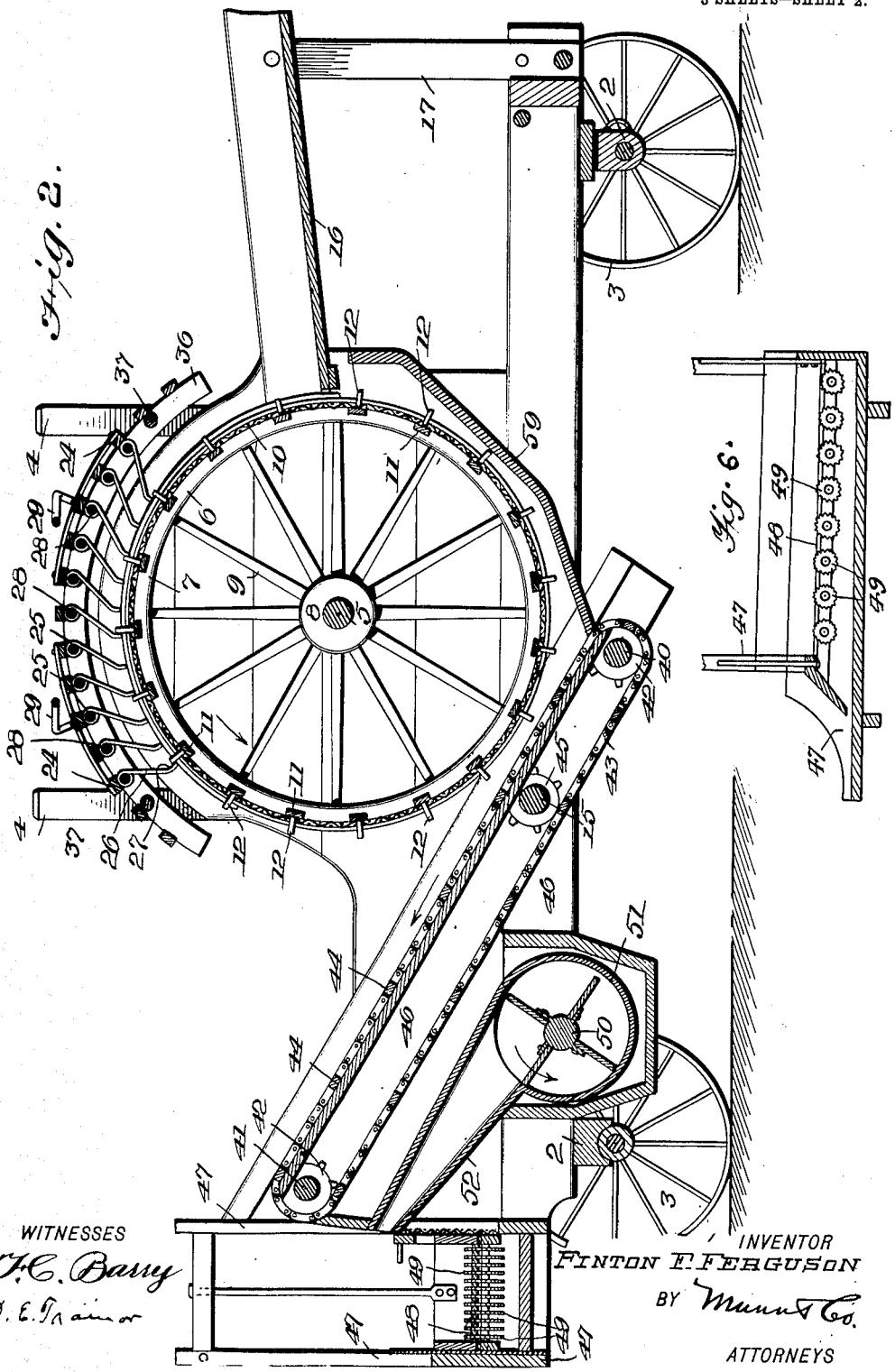

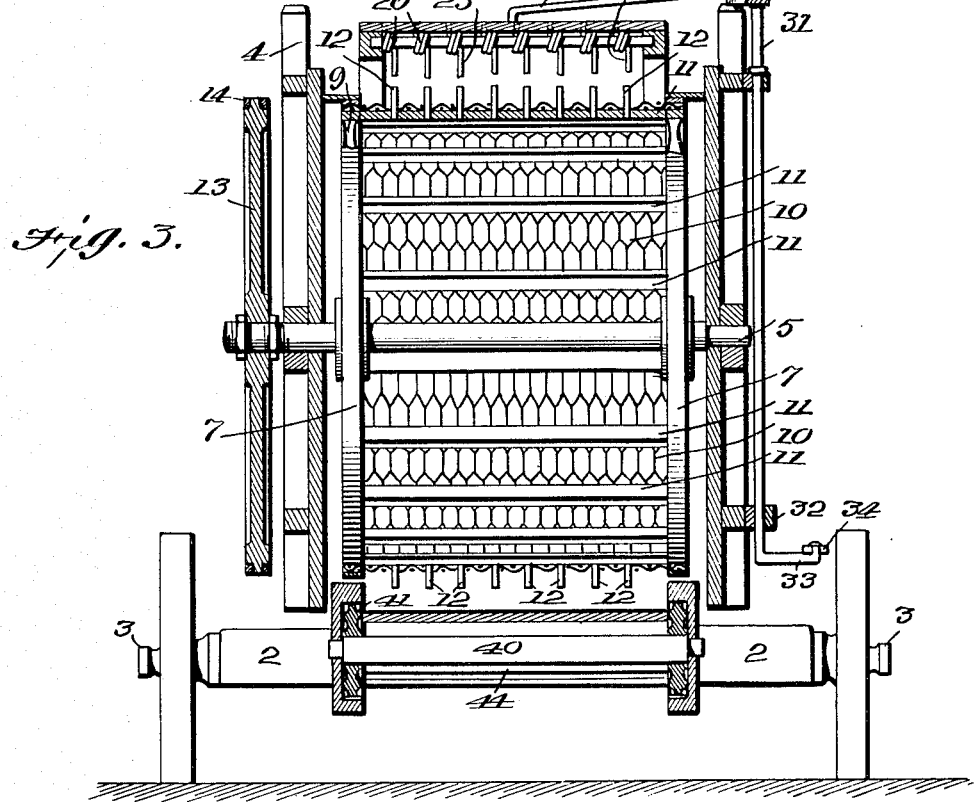
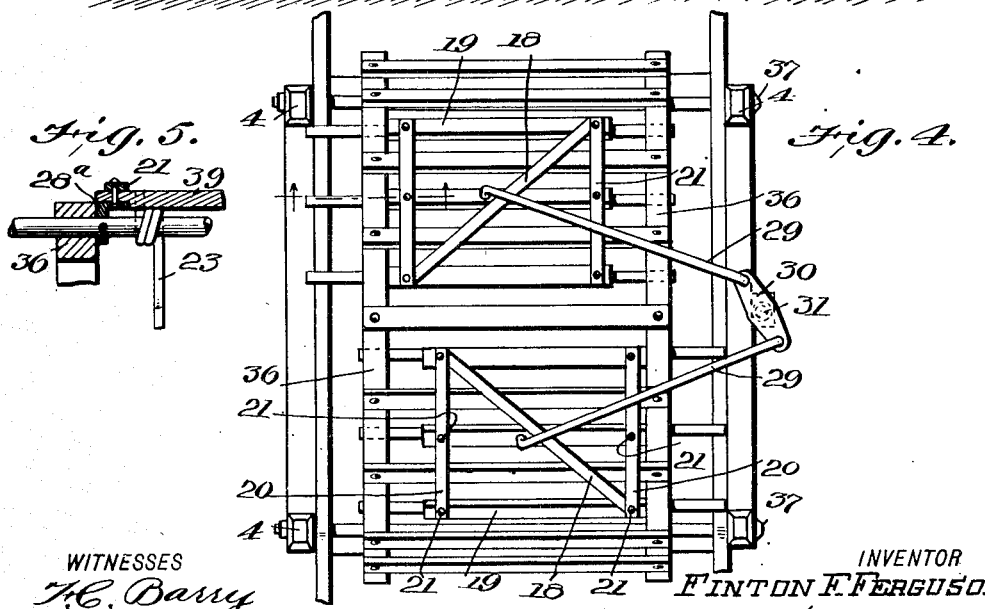

FINTON F. FERGUSON, OF MURFREESBORO, NORTH CAROLINA.

PEANUT-PICKING MACHINE.

No. 912,835.   Specification of Letters Patent.   Patented Feb. 16, 1909.

Application filed May 13, 1908. Serial No. 432,654.

*To all whom it may concern:*

Be it known that I, FINTON F. FERGUSON, a citizen of the United States, and a resident of Murfreesboro, in the county of Hertford and State of North Carolina, have made certain new and useful Improvements in Peanut-Picking Machines, of which the following is a specification.

My invention is an improvement in peanut picking machines and consists in certain novel constructions and combinations of parts hereinafter described and claimed.

Referring to the drawings forming a part hereof—Figure 1 is a perspective view of the improvement; Fig. 2 is a central longitudinal section; Fig. 3 is a vertical section; Fig. 4 is a plan view of the central portion of the machine, Fig. 5 is a detail sectional view on the line 5—5 of Fig. 4, and Fig. 6 is a longitudinal section of the stemming device.

The present embodiment of my invention comprises a frame 1 provided at each end with axles 2, upon which are journaled wheels 3 and the frame is provided at approximately its center with side plates 4, in which is journaled a shaft 5, having secured thereto a drum 6, the drum consisting of separated rings 7, connected to the hubs 8 by spokes 9, the hubs being secured to the shaft, and the rings are connected by a netting 10.

At spaced intervals on the peripheral surface of the drum and beneath the netting are arranged transverse bars 11, provided with a longitudinal series of spaced pins 12, and one of the ends of the shaft has secured thereto a sprocket wheel 13 of relatively large diameter, connected by a sprocket chain 14 with the power shaft 15, which is journaled on the frame at the rear of the side plates 4.

A feed chute 16 is supported at the front of the frame by the uprights 17 connected with the frame, and the delivery end of the feed chute is arranged slightly above the center of the drum as shown in Fig. 1.

Coöperating with the drum, are a pair of frames 18, each consisting of bars 19 arranged transversely of the drum and connected by straps 20 arranged transversely of the bars and secured thereto as at 21, and by a diagonal brace 22, and the lower faces of the bars are provided with spring teeth 23 the said teeth having a portion 24, inserted in the bar and being provided below the bar with a coil 25, and from the coil the teeth are bent backwardly as at 26 and downwardly as at 27, the tip of the teeth extending slightly below the level of the tips of the pins as shown in Fig. 2. A pipe or rod 28 extends through the coils of the teeth on a bar, and the said pipes or rods are bolted to the bars, whereby to secure the teeth in place, as at 28ª.

The frames have pivoted thereto at approximately the center thereof, one end of a link 29, the other end of the link being pivoted to a lever 30, which is secured by its center to a vertical shaft 31, journaled in bearings 32 on the side plates, and provided at its lower end with a cranked portion 33, connected by a link 34 with a crank 35 on the shaft 15 before mentioned. It will be obvious from the description, that when the shaft 31 is oscillated the frames will be moved transversely of the drum in opposite directions.

Arc-shaped bars 36 are connected to the side plates 4 by means of bolts 37, traversing openings in the bars and slots 38 in the side plates, and the said arc-shaped plates are connected by cross bars 39 arranged at spaced intervals, and provided on their lower surfaces with the teeth 23 before mentioned, the cross bars 39 being omitted at the points occupied by the bars 19 of the vibrating frames. The bars 39 are engaged by the straps 20, thus serving to support and guide the vibrating frames.

An endless carrier is arranged below the drum, the said carrier comprising spaced shafts 40 and 41, the shaft 40 being arranged below the drum and the shaft 41 at the rear thereof, and each of the shafts is provided with spaced sprocket wheels 42, engaged by endless sprocket chains 43, which are connected at suitable intervals by slats 44. The power shaft 15 is arranged intermediate the shafts 40 and 41, and is provided with sprocket wheels 45 also engaging the sprocket chains 43 whereby to drive the same. A board 46 is arranged below the upper run of the endless carrier as shown in Fig. 2, and the said carrier delivers to a peanut stemming device arranged at the rear of the machine. The stemming device is of ordinary construction, comprising a frame 47, having a false bottom composed of spaced slats 48, between which are arranged toothed disks 49, the teeth of the disks engaging the stems and drawing them through the slats thus stripping the peanuts from the vines.

A fan 50 is arranged below the endless carrier, the casing 51 of the fan being provided with a delivery spout 52 opening below the delivery end of the endless carrier and into the stemming device as shown in Fig. 2. The outer end of the shaft of the fan 50 is provided with a sprocket wheel 53, connected by a sprocket chain 54, with a sprocket wheel 55 on the power shaft 15 and the said power shaft is provided with another sprocket wheel 56 connected by a sprocket chain 57 with a sprocket wheel 58 on the end of the upper shaft 41 of the endless conveyer.

The lower portion of the drum is cased in as shown at 59, and the fan casing is provided with end openings 60, for admitting the air thereto.

In operation, the vines are fed through the chute 16 against the drum, and are engaged by the pins 12, and carried rearwardly beneath the vibrating frames, and against the spring teeth 23. The passage of the vines beneath the teeth, separates them from each other, and removes the greater part of the nuts therefrom, the nuts falling through the drum on to the carrier, which delivers them onto the stemming device at the rear, the fan acting to clean them from the leaves and broken stems.

The perforated covering used on the drum, permits the nuts to fall through while retaining the leaves and vines, and compelling them to pass around the periphery of the drum, thus aiding in separating all of the nuts from the vines.

I claim:

1. A peanut picking machine comprising a wheel supported frame, a feed chute, a drum journaled in the frame behind the feed chute, said drum comprising spaced heads and a perforated covering connecting the heads, bars arranged longitudinally of the drum at spaced intervals beneath the perforated covering, said bars being provided at regular intervals with pins projecting radially beyond the perforated covering, an arc-shaped frame supported on the drum, said frame being provided with spring teeth projecting below the free ends of the pins, a pair of frames mounted to slide on said arc-shaped frame longitudinally of the drum, an endless conveyer below the drum, a stemming device to which the conveyer delivers, a fan delivering below the delivery end of the conveyer and means for operating said parts.

2. A peanut picking machine comprising a drum, said drum comprising spaced heads and a perforated covering connecting the heads, bars arranged longitudinally of the drum at spaced intervals beneath the perforated covering, said bars being provided at regular intervals with pins projecting radially beyond the perforated covering, a pair of frames mounted to slide transversely of the drum, said frames being provided with spring teeth projecting below the free ends of the pins an endless conveyer below the drum, a stemming device to which the conveyer delivers, a fan delivering below the delivery end of the conveyer and means for operating said parts.

3. A peanut picking machine comprising a drum mounted for rotation, said drum comprising spaced heads a perforated covering connecting the heads, longitudinal series of spaced pins arranged on the periphery of the drum, a pair of frames mounted to slide transversely of the direction of movement of the drum, said frames being provided with spring teeth projecting below the free ends of the pins, an endless conveyer below the drum, a stemming device to which the conveyer delivers, a fan delivering below the delivery end of the conveyer, and means for operating said parts.

4. A peanut picking machine comprising a drum mounted for rotation, said drum comprising spaced heads a perforated covering connecting the heads, longitudinal series of spaced pins on the periphery of the drum, a frame provided with spring teeth projecting below the free ends of the pins and mounted for sliding movement longitudinally of the drum, an endless conveyer below the drum, a stemming device to which the conveyer delivers, and a fan delivering below the delivery end of the conveyer.

5. A peanut picking machine comprising a drum mounted for rotation, said drum comprising spaced heads a perforated covering connecting the heads, a plurality of longitudinal series of spaced pins on the periphery of the drum, a plurality of series of spring teeth arranged above the drum, the tips of the teeth projecting below the tips of the pins, means for reciprocating the teeth simultaneously longitudinally of the drum, a stemming device, an endless conveyer for receiving the vines from the drum and delivering them to the stemming device, and a fan between the delivery end of the conveyer and the stemming device.

6. A peanut picking machine comprising a drum having openings in its peripheral surface, longitudinal series of spaced pins on the periphery of the drum, means for rotating the drum, a series of spring teeth arranged above the drum with the points thereof projecting below the tips of the pins, means for reciprocating the series in unison, a stemming device, and an endless conveyer receiving from the drum and delivering to the stemming device.

7. A peanut picking machine comprising a drum having perforations in its peripheral surface, longitudinal series of spaced pins on the periphery of the drum, a series of spring teeth mounted for movement longitudinally of the drum, the tips of the teeth projecting below the tips of the pins, a stemming device, and means for receiving the vines from the drum and delivering them to the stemming device.

8. In a peanut picking machine, a rotatable drum provided on its peripheral surface with longitudinal series of spaced pins, a series of spring teeth mounted adjacent to the periphery of the drum and movable between the pins, means for rotating the drum, and means for reciprocating the teeth.

9. In a peanut picking machine, a rotatable drum provided on its peripheral surface with radially projecting pins, a series of spring teeth movable between the pins, means for rotating the drum, and means for reciprocating the teeth simultaneously.

10. In a peanut picking machine, a rotatable drum provided on its peripheral surface with radially projecting pins, a frame movable longitudinally of the drum, said frame comprising spaced bars and spring teeth connected with the bars, said teeth having each a coil adjacent to the bars, and a rod traversing the coils and secured to the bar.

11. In a peanut picking machine, a rotatable drum provided on its peripheral surface with radially projecting pins, and spring teeth movable longitudinally of the drum and coöperating with the pins to separate the nuts from the vines.

FINTON F. FERGUSON.

Witnesses:
JOHN B. TRADER,
EMMETT N. EVANS.